US010881053B2

(12) United States Patent
Kerschgens et al.

(10) Patent No.: US 10,881,053 B2
(45) Date of Patent: Jan. 5, 2021

(54) COOLING AND CONDENSATION DEVICE FOR A GREENHOUSE

(71) Applicants: Daniel Kerschgens, Vienna (AT); Heinz Georg Russwurm, Vienna (AT)

(72) Inventors: Daniel Kerschgens, Vienna (AT); Heinz Georg Russwurm, Vienna (AT)

(73) Assignees: Daniel Kerschgens, Vienna (AT); Heinz Georg Russwurm, Vienna (AT)

( * ) Notice: Subject to any disclaimer, the term of this patent is extended or adjusted under 35 U.S.C. 154(b) by 406 days.

(21) Appl. No.: 15/746,015

(22) PCT Filed: Jul. 19, 2016

(86) PCT No.: PCT/EP2016/067173
§ 371 (c)(1),
(2) Date: Jan. 19, 2018

(87) PCT Pub. No.: WO2017/013112
PCT Pub. Date: Jan. 26, 2017

(65) Prior Publication Data
US 2018/0199522 A1    Jul. 19, 2018

(30) Foreign Application Priority Data
Jul. 21, 2015    (AT) .................................. 50641/2015

(51) Int. Cl.
*A01G 9/24* (2006.01)
(52) U.S. Cl.
CPC ............. *A01G 9/246* (2013.01); *Y02A 40/25* (2018.01)
(58) Field of Classification Search
CPC ....... A01G 9/24; A01G 9/246; F28F 2255/02; F28F 1/025; F28F 1/06; F28F 1/08; F28F 1/105; F28F 1/40; F28F 9/013
(Continued)

(56) References Cited

U.S. PATENT DOCUMENTS 2,625,872 A * 1/1953 Follansbee ............ F24H 9/0052
454/232
2,804,284 A * 8/1957 Otten ........................ F28F 1/22
165/166
(Continued)

FOREIGN PATENT DOCUMENTS

CN     104142075 A    11/2014
CN     204006817 U    12/2014
(Continued)

OTHER PUBLICATIONS

English abstract of JP 2011-252619 A.
English abstract of CN 104142075 A.

*Primary Examiner* — David J Parsley
*Assistant Examiner* — Danielle A Clerkley
(74) *Attorney, Agent, or Firm* — David P. Dickerson

(57) ABSTRACT

The invention relates to a cooling and condensation device (10) of a greenhouse (1), preferably of a plastic film greenhouse, comprising at least one condenser (11) located in the greenhouse (1). The exterior (21) of the wall of said condenser is in contact with the air in the greenhouse (1) to be cooled and a cooling medium is applied to the interior (22) of the wall. According to the invention, the at least one condenser (11) is designed as a film tube that can be folded and consists, for example, of hollow articles (12), produced of a film material that can be folded, and stringed together, the tubular condenser (11) being deployable from a folded storage form to an elongated operating form.

11 Claims, 5 Drawing Sheets

Figure 2:
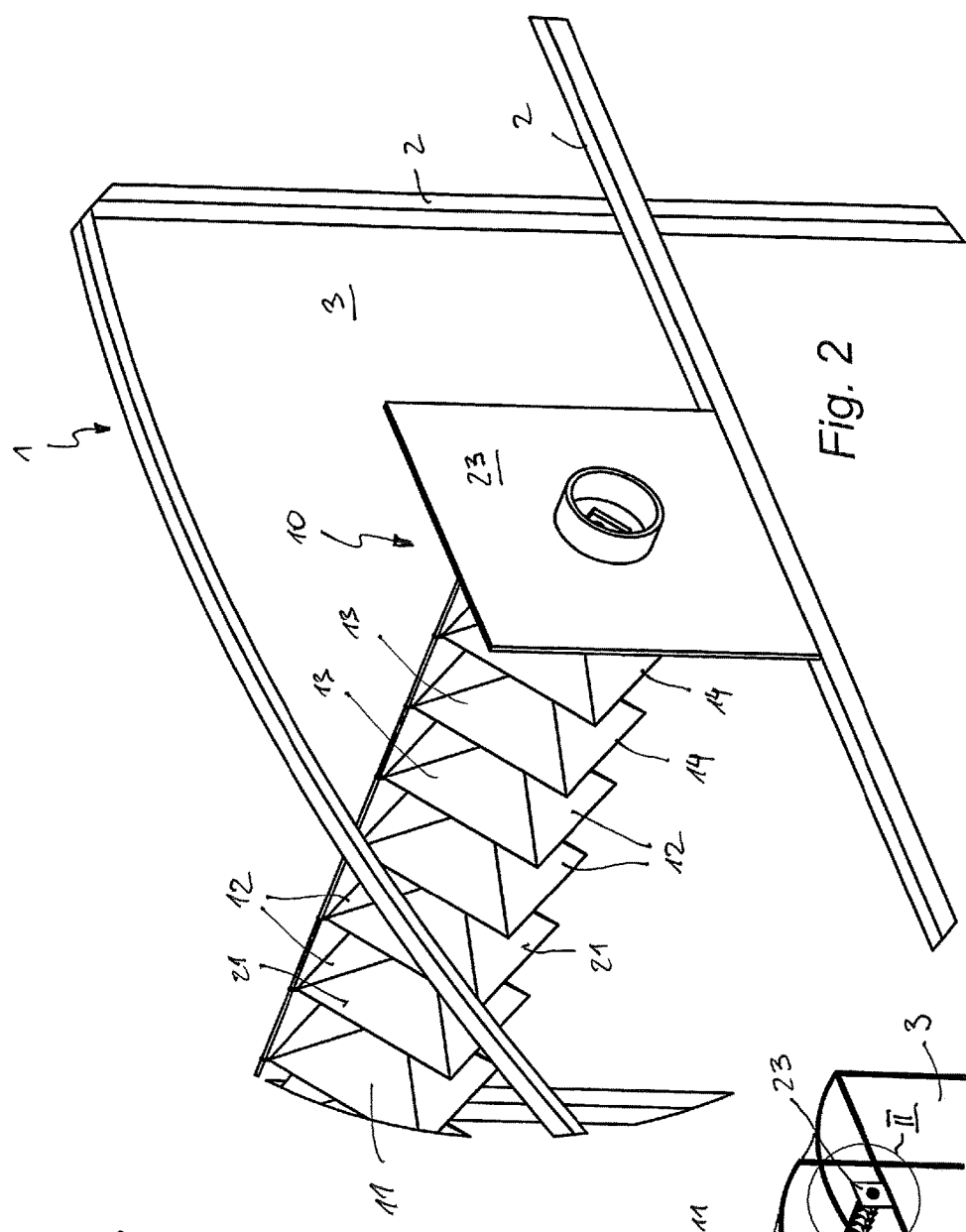

(58) Field of Classification Search
USPC ....... 47/17, 19.2; 454/334; 165/83, 181, 183
See application file for complete search history.

(56) References Cited

U.S. PATENT DOCUMENTS

| | | | | | |
|---|---|---|---|---|---|
| 3,359,687 | A | * | 12/1967 | Wallace | B64D 13/04 49/477.1 |
| 4,163,342 | A | * | 8/1979 | Fogg | A01G 7/045 47/58.1 R |
| 4,290,242 | A | * | 9/1981 | Gregory, Jr. | A01G 9/225 52/2.17 |
| 4,291,499 | A | * | 9/1981 | Prewer | A01G 31/02 47/17 |
| 4,352,259 | A | * | 10/1982 | Smith | A01G 9/225 52/2.17 |
| 4,672,888 | A | * | 6/1987 | Crombie | A01G 9/241 454/254 |
| 6,442,903 | B1 | * | 9/2002 | Hebert | A01G 9/1415 52/2.11 |
| 6,470,964 | B1 | * | 10/2002 | Nakado | F28D 1/0391 165/133 |
| 7,094,144 | B2 | * | 8/2006 | Dube | A01K 1/0064 454/334 |
| 7,748,169 | B2 | * | 7/2010 | Cote | E06B 9/02 52/2.11 |
| 8,397,434 | B2 | * | 3/2013 | Bayne | A01G 9/1415 52/2.11 |
| 2004/0099408 | A1 | * | 5/2004 | Shabtay | F28F 1/003 165/177 |
| 2004/0194371 | A1 | | 10/2004 | Kinnis | |

FOREIGN PATENT DOCUMENTS

| | | | |
|---|---|---|---|
| EP | 97051 A1 | * 12/1983 | ............... A01G 9/22 |
| GB | 2472041 A | 1/2011 | |
| JP | 2011-252619 A | 12/2011 | |
| NL | 9001874 A | 8/1990 | |
| WO | 2003/099408 A1 | 12/2003 | |
| WO | 2015/028470 A1 | 3/2015 | |
| WO | 2015/093943 A1 | 6/2015 | |

* cited by examiner

COOLING AND CONDENSATION DEVICE FOR A GREENHOUSE

The invention relates to a cooling and condensation device for a greenhouse, preferably, a plastic film greenhouse, comprising at least one condenser located in the greenhouse, the exterior of the wall of the condenser is in contact with the air in the greenhouse to be cooled and a cooling medium is applied to the interior thereof.

In the course of the day, greenhouses or plastic film greenhouses are often heated by the strong radiation of the sun to a degree which is harmful for the cultures inside the greenhouse. In the simplest case, it is thus required to open some ventilation flaps, which however may generate an air draft, which may be harmful for the cultures and in addition discharges water vapor together with the escaping hot air and thus dehydrates the soil inside the greenhouse and also the cultures.

Thus, already some solutions relating to a heat exchanger device have been proposed, which, for example, are described in WO 2015/028470. The greenhouse therewith described comprises a heat exchanger device including at least three pairs of pipings, which are suspended by means of a support device on a support structure above the planting space of the greenhouse. The pipings are spiral rib pipes including radially protruding spiral ribs, wherein the pipings may be adjusted be means of the support device between an upper position, in the head area of the plants, and a lower position, in the area of the planting grooves. During cooling operation, cooling water, which preferably has a temperature below the dew point of the air in the greenhouse, flows through the pipings, wherein, during cooling operations, the pipings are arranged in the upper position, in the head area of the plants, so that the warm humid air, which rises in the greenhouse, may flow around the pipings. This has the effect that the humidity contained in the air is condensing on the pipings. The condensate may then be supplied to the plants. The heat exchange device is quite bulky and heavy, in particular, when taking the weight of the cooling water into account, so that additional support elements are mandatorily required, in case the heat exchange device is mounted in greenhouses having a lightweight design or plastic film greenhouses.

It is an objective of the invention to propose a cooling and condensation device for a greenhouse, which enables a simple and cost-efficient fabrication, which provides the possibility to expand existing greenhouses and to ensure a smooth usage in plastic film greenhouses.

According to the invention, the objective is achieved in that the at least one condenser is formed as foldable film tube and, in particular, is formed of hollow articles made of a foldable film material, which are stringed together, wherein the tubular condenser may be unfoldable from a folded storage form into an elongated operating form.

The advantage of the invention is, in particular, that instead of the rigid, heavy structure of the device known from WO 2015/28470, which has to be adapted to the specific form and dimension of a greenhouse by means of the spiral pipings and the support devices, lightweight, completely flexible condensers made of a foldable film material, fabricated of a plastic material, may be used, which may be stored in a folded state and may be unfoldable during mounting in the greenhouse—similar to bellows.

A further advantage is realized at dismantling the cooling and condensation device, as significant parts, namely the tubular condensers made of film material, may be recycled and thus no cleaning and storing of said parts is required at the end of the season.

Preferably, the single hollow articles of the condenser comprise lateral surfaces of straight truncated pyramids or truncated cones, which include a base rim and a collar-shaped transition opening to the adjacent hollow article, wherein the truncated pyramids or the truncated cones are respectively connected with one another on the base rims and the collars thereof. The base structure may be triangular, quadrangular or also hexagonal, wherein also hollow articles formed as double truncated cone are possible.

Advantages in manufacturing are achieved here, when the hollow articles of the condenser comprise a square cross-section area and form a flat octahedron-shaped body, wherein two opposite truncated corners are cut in order to form the transition openings for the cooling medium.

This leads to two main variants of the embodiment for the cooling and condensation device according to the invention, wherein in a first variant of the at least one tubular condenser or more tubular condensers, which are arranged parallel to one another, is/are mounted in the greenhouse in a horizontal position, and a second variant of the embodiment, wherein the tubular condensers are mounted in a greenhouse in a vertical direction hanging from the ceiling in an unrestricted way.

Figure 3:
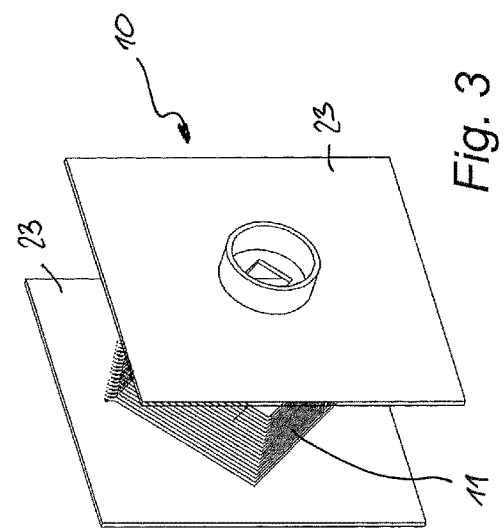
Figure 1:
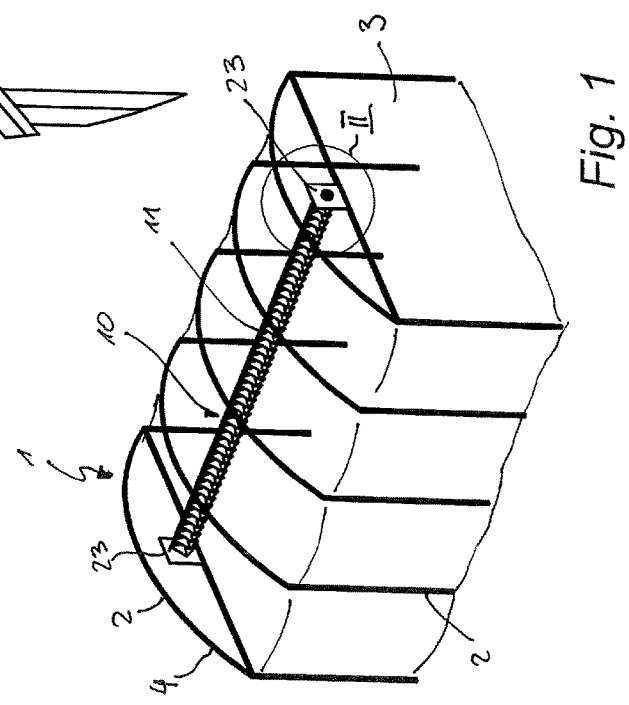
Figure 5:
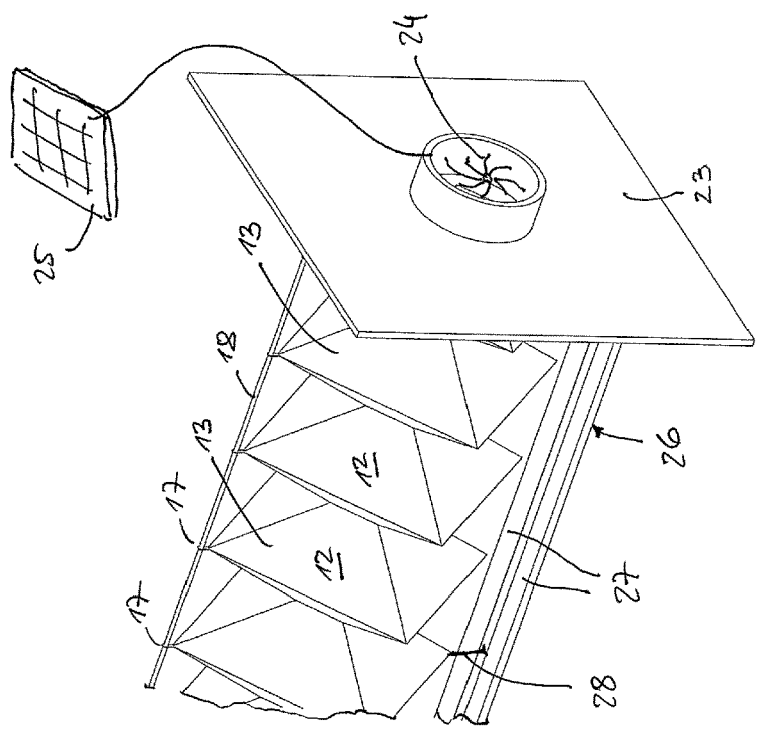
Figure 4:
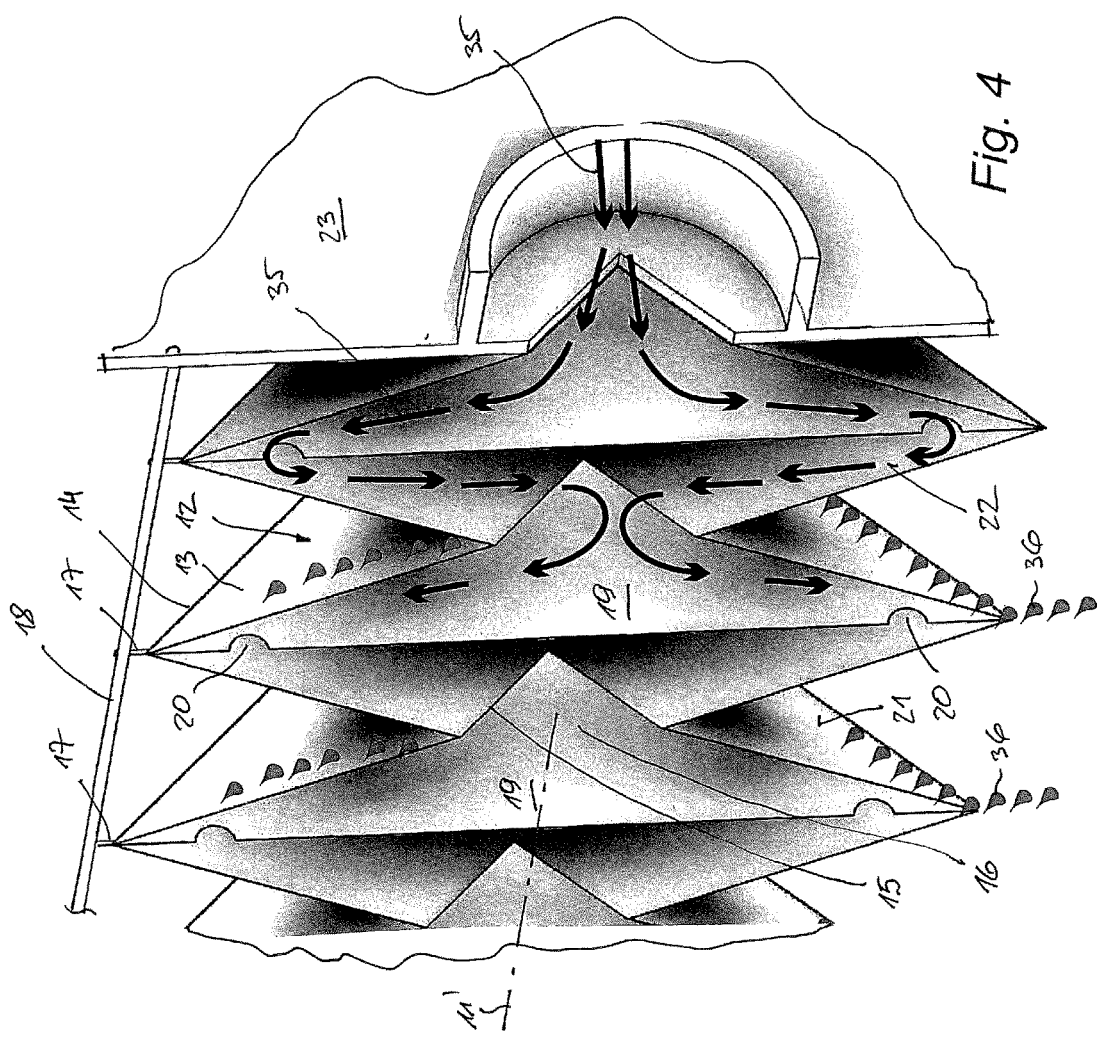
Figure 7:
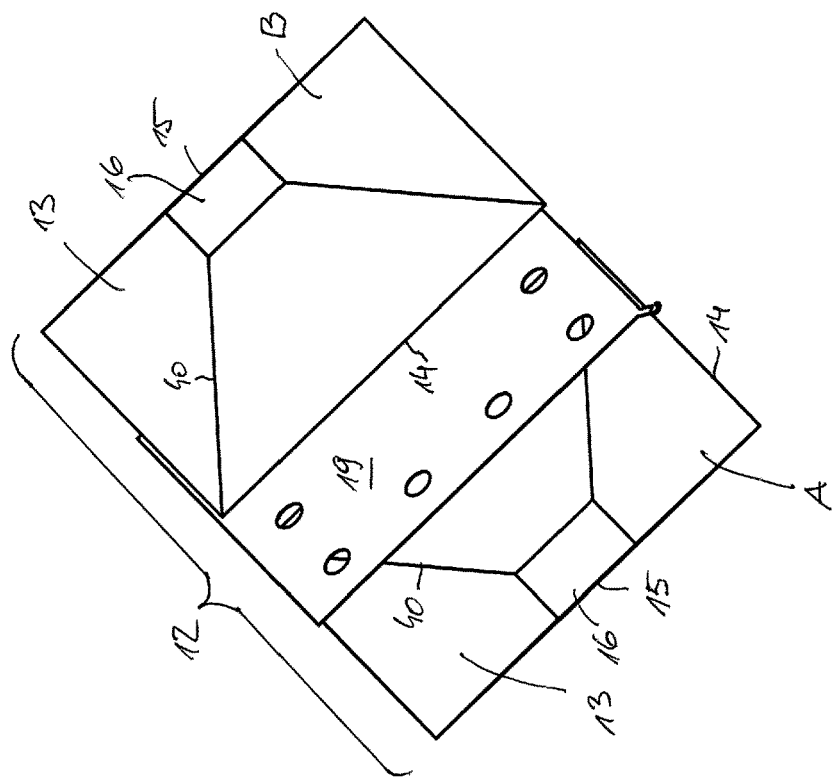
Figure 6:
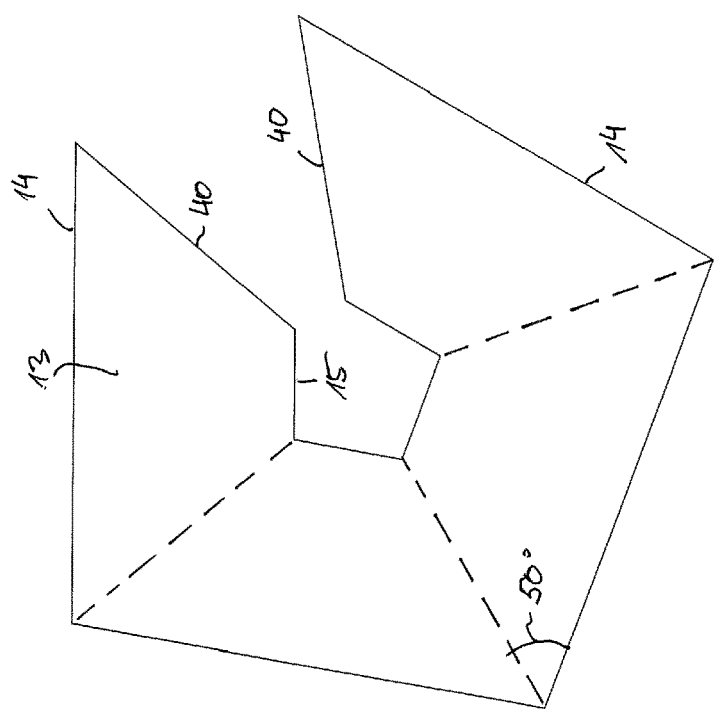
Figure 9:
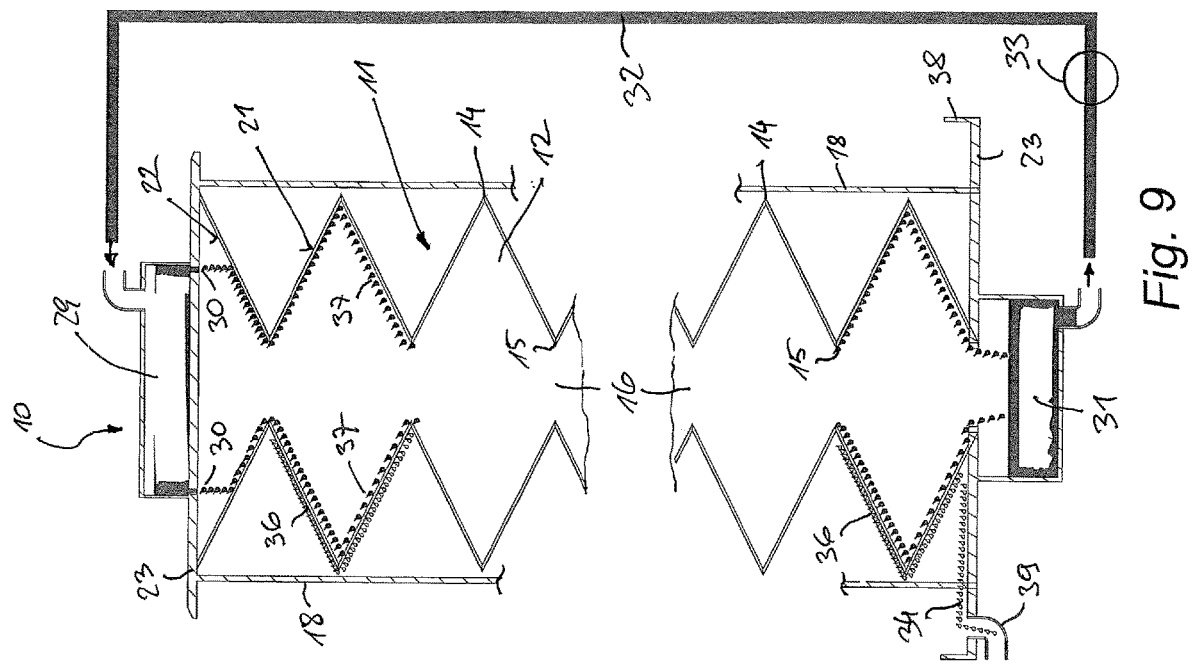
Figure 8:
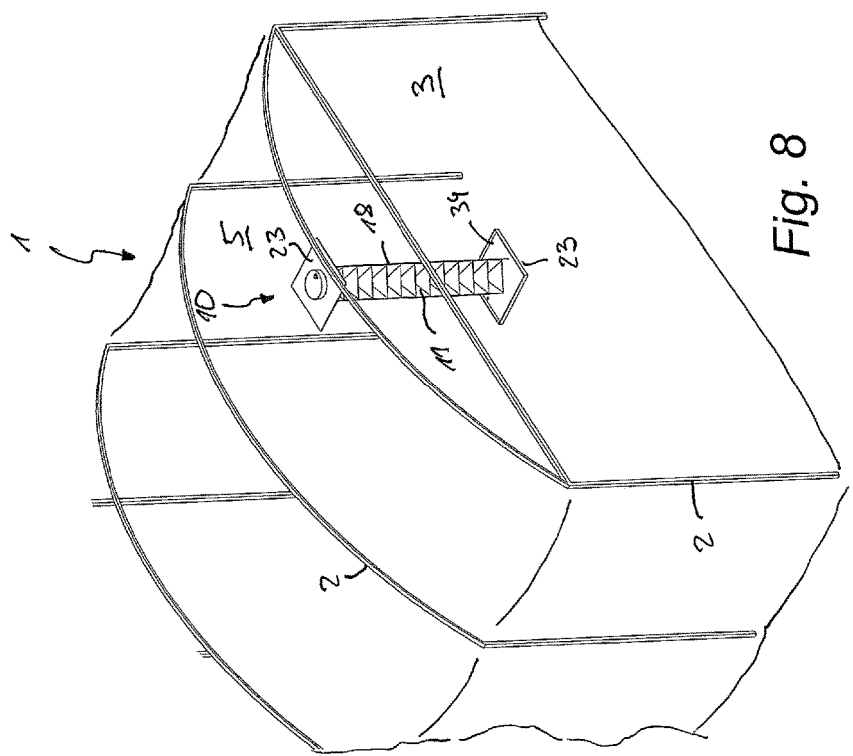
Figure 11:
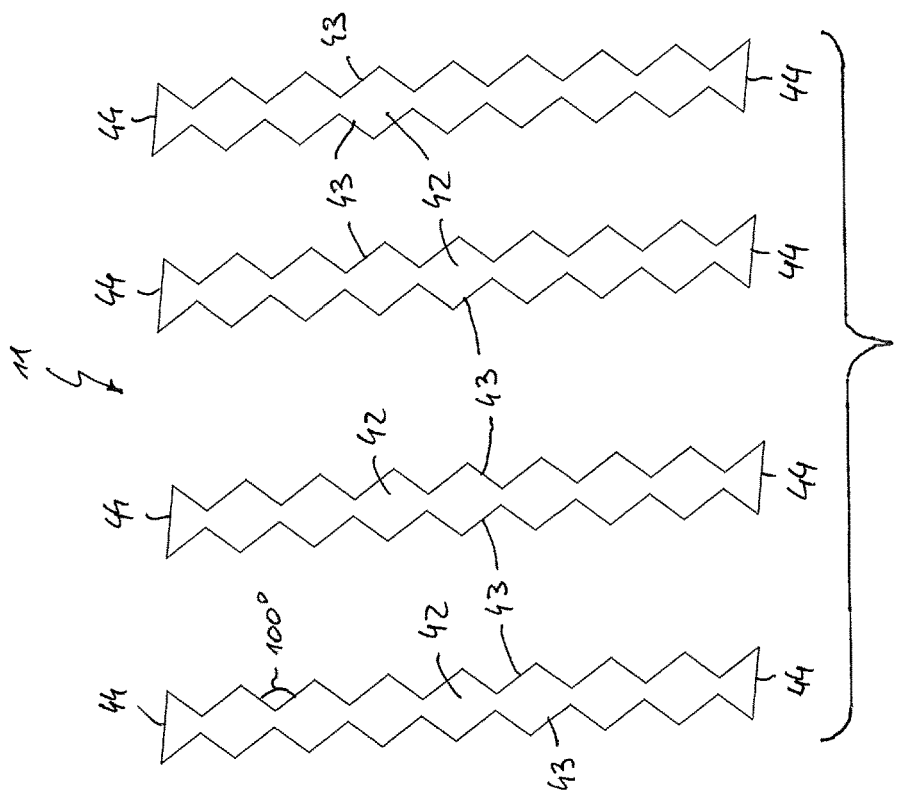
Figure 10:
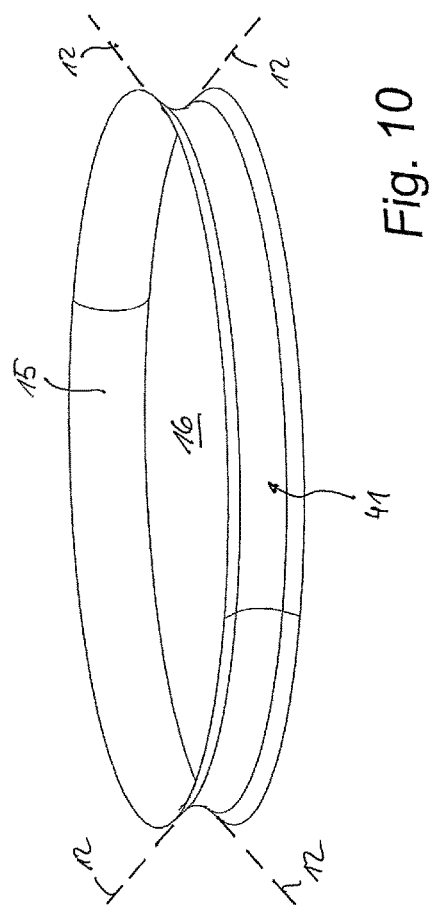

The preferred variants of the embodiment of the cooling and condensation device according to the invention will be described in detail in the following figures. The figures show in:

FIG. 1 a three-dimensional view of a first variant of the embodiment of a cooling and condensation device according to the invention having a horizontal tubular condenser;

FIG. 2 an enlarged illustration of a detail II of the condenser of FIG. 1;

FIG. 3 the condenser of FIG. 1 in the folded state;

FIG. 4 a detailed illustration of a longitudinal section of the condenser according to FIG. 2;

FIG. 5 the condenser of FIG. 2 including additional components;

FIG. 6 a flat film element for producing a hollow article of the tubular condenser;

FIG. 7 a three-dimensional view of single elements of the hollow article for producing the tubular condenser;

FIG. 8 a second variant of the embodiment of a cooling and condensation device according to the invention having a vertical tubular condenser in a three-dimensional view;

FIG. 9 an enlarged section view of the vertical condenser according to FIG. 8;

FIG. 10 a transition element of the vertical condenser between the single hollow articles; and FIG. 11 a variant of an embodiment for producing a tubular condenser according to FIG. 8.

The variant of the embodiment of a cooling and condensation device 10 for a greenhouse 1 having a metal frame 2, which is covered with a film, as shown in FIGS. 1 to 7, comprises at least one, basically horizontally arranged tubular condenser 11 (wherein of course a plurality of condensers 11 being arranged parallel to one another are advantageous), the exterior 21 of the wall thereof is in contact with the air in the greenhouse 1, which is to be cooled, and a cooling medium is applied to the interior 22 of the wall. The tubular condensers 11 are formed for example of hollow articles 12 made of a foldable film material, which are stringed together, which may be unfolded from a compact folded storage form (see FIG. 3) into the elongated operating form, which is shown in FIG. 1 and FIG. 2, for example.

In the folded storage form, the length of the film tube may be shortened by about 70% to 95%—as compared to the operating form.

In order to enlarge the efficient surface of the cooling device and for an easier foldability, the hollow articles 12 of the condenser 11 are, for example, formed of lateral surfaces 13 of straight truncated pyramids or truncated cones, which include a base rim 14 and a collar 15, which forms a transition opening 16 to the adjacent hollow article 12, respectively, wherein the truncated pyramids or truncated cones are connected to each other on the base rims 14 and the collars 15 thereof, respectively.

In an easy to produce variant of the embodiment (see FIG. 1 to FIG. 7), the hollow articles 12 of the condenser 11 comprise a square cross-section area and form a flat octagon-shaped body, wherein two opposite truncated corners are cut in order to form the transition openings 16 for the cooling medium (see FIG. 4).

Fastening means 17, 18 are provided for horizontal mounting of the tubular condensers 11 in the greenhouse 1, wherein on the input end and the output end of each tubular condenser 11 a connecting flange 23 is formed, respectively, which may be connected to an opening passage in a wall, the front wall 3 and the rear wall 4 of the greenhouse 1 (see FIG. 1 and FIG. 2), for example.

As fastening means for the tubular condenser 11 hooks 17 may be provided, which are fastened on the hollow articles 12, which engage with a support rope 18, which is preferably made of a plastic material. The support rope 18 may for example be fastened to the two connecting flanges 23.

According to the invention, a separating surface 19 is arranged in the area of the base rim 14, respectively, which is normal to the longitudinal axis 11' of the condenser 11, which on the rim thereof comprises passage openings 20 for the air used as a cooling medium, preferably ambient air or external air (see FIG. 4, arrows 35). By means of this measure, the airflow becomes deflected a number of times, the flow path is extended, and the cooling effect is increased. The condensate 36, which drips off on the exterior 21 of the condenser 11, is also shown.

The separating surfaces 19 arranged inside the hollow articles 12 comprise a larger wall thickness or are formed in a more rigid way than the flexible lateral surface 13 and thus provide a support function for the hollow articles 12 in the elongated operating form thereof.

A ventilation device 24 is arranged on or at least in one connecting flange 23 of the condenser 11, by means of which a cooling airflow through the condenser 11 may be produced in the direction of pressure or the direction of suction. Preferably, the ventilation device 24 may be powered by electrical energy of a solar panel 25.

According to the invention, in the operating position, an inflatable collection groove 26 may be mounted below the tubular condenser 11 in order to receive the condensate 36, which is generated on the exterior 21 of condenser 11. According to the variant of the embodiment shown (see FIG. 5), the collection groove 26 is made of a film material and comprises inflatable, tubular compartments 27 on the rim thereof, onto which holding elements 28 engage, which are fastened to the hollow articles 12 of the tubular condenser 11. The collection grooves 26 may also be recycled at the end of the season.

FIG. 6 shows a flat film element for producing a hollow article 12 of the tubular condenser 11, which is punched or cut out of a plastic film and results in the lateral surface 13 of a rectangular, square truncated pyramid after fusing and gluing along the edges 40. The four trapezoid surfaces each include an acute angle of about 50°. According to FIG. 7, the single hollow articles 12 are formed of the first truncated pyramid A and the second truncated pyramid B, the base rims 14 thereof are fused or glued to one another by inserting a separating surface 19 including passage openings 20 on the rim for the cooling air. Finally, the single hollow articles 12 are fused or glued on the collar 15, which forms the transition opening 16.

According to FIG. 6, it is also possible to arrange two flat film elements one upon the other and then at first fuse them on the line of the collar 15. Afterwards, the two film elements are raised in opposite directions and are fused on the edges 40. The thus created elements are then connected to one another to a tubular condenser 11 by inserting a separating surface 19 between them, respectively.

The variant of the embodiment of a cooling and condensation device 10 for a greenhouse 1 having a metal frame 2, which is covered with a film, as shown in FIGS. 8 to 10, comprises at least one, basically vertically arranged, tubular condenser 11 (wherein of course a plurality of condensers 11 being arranged parallel to one another are advantageous), the exterior 21 of the wall thereof is in contact with the air in the greenhouse 1, which is to be cooled, and a cooling medium (cooling water in the form of drops) is applied on the interior 22 of the wall. The tubular condensers 11 are formed for example of hollow articles 12 made of a foldable film material, which are stringed together—as described above—which may be unfolded from a compact folded storage form (see FIG. 3) into the elongated operating form, which is shown in FIG. 8, for example.

On the input end of the tubular condenser 11, preferably on a connecting flange 23, by means of which the condenser is fastened to the ceiling film 5 or to the metal frame 2 of the greenhouse 1, a cooling water container 29 is formed, which comprises openings 30 on the bottom side thereof for dispensing cooling water 37 in the form of drops into the interior of the tubular condenser 11. The cooling water, which is dispensed in the form of drops, drips into the interior 22 of the hollow article 12 made of film material and runs off along the inner surface. On the exterior of the condenser a condensate 36 is formed under appropriate conditions, which in simple variants of the embodiment drips directly on the plants in the greenhouse 1.

According to an advantageous extension, a collection container 31 for cooling water may be formed on the output end of the tubular condenser 11, preferably on the connecting flange 23 located at the end-side, wherein starting from the collection container 31 a return device 32 for cooling water is provided, which ends in the cooling water container 29 located on the input side. In addition, the return device 32 may be preferably equipped with a cooling water pump 33, preferably operated by solar energy.

In order to limit the longitudinal extension of the condenser 11 hanging from the ceiling of the greenhouse 1, support ropes 18, preferably made of a plastic material, are tensioned between the connecting flanges 23 on the input-side and the output-side. In the vertical variant having a drop cooling, no separating surfaces 19 are provided.

In case the condensate 36 is not to drip on the cultures in an unrestricted way, a collecting trough 34 may be mounted on the output end of the tubular condenser 11 in order to receive the condensate, which is generated on the exterior 21 of the condenser 11. In the variant of the embodiment shown, the collecting through 34 is formed by a circumferential wall 38 of the lower connecting flange 23, and comprises a discharge tube 39.

FIG. 10 shows a transition element 41 of the vertical condenser 11 made of film material, which may be fused or glued between adjacent hollow articles 12 (only schematically indicated) to round off the transition on the collar 15, which forms the transition opening 16. By means of this measure, the wetting of the interior of the condenser 11 is improved, and a dripping off of the cooling water on the collar 15 is prevented.

For the vertically arranged variant of the cooling and condensation device 10, the foldable, tubular condenser 11 may be formed of a plurality of film strips 42 (4 in the shown variant), according to FIG. 11, which may be fused or glued on the lateral edges 43, which may be toothed in an angle of about 100°, for example. Subsequently, connecting flanges 32 are fastened on the ends 44.

The invention claimed is:

1. A greenhouse condenser system, comprising:
a foldable plastic film tube, wherein
said foldable plastic film tube comprises a plurality of identical hollow bodies,
each of said hollow bodies comprises a first frustum-shaped portion and a second frustum-shaped portion, a base portion of said first frustum-shaped portion facing a base portion of said second frustum-shaped portion, and
each of said hollow bodies comprises a separating sheet situated adjacent said base portion of said first frustum-shaped portion and adjacent said base portion of said second frustum-shaped portion.

2. The greenhouse condenser system of claim 1, wherein:
said separating sheet partially obstructs a flow of a medium through a lumen of said foldable plastic film tube.

3. The greenhouse condenser system of claim 1, wherein:
said separating sheet redirects a flow of a medium in said foldable plastic film tube.

4. The greenhouse condenser system of claim 1, wherein:
said separating sheet comprises a plurality of openings.

5. The greenhouse condenser system of claim 1, wherein:
said separating sheet comprises a material stiffer than a plastic film of said first frustum-shaped portion.

6. The greenhouse condenser system of claim 1, wherein:
said foldable plastic film tube has a generally bellows-like shape.

7. A greenhouse condenser system, comprising:
a condenser tube having a first length in an extended operating state, wherein
in a retracted state, said condenser tube has a second length that is less than 30% of said first length,
said condenser tube comprises a plurality of identical hollow bodies,
each of said hollow bodies comprises a first frustum-shaped portion and a second frustum-shaped portion, a base portion of said first frustum-shaped portion facing a base portion of said second frustum-shaped portion, and
each of said hollow bodies comprises a separating sheet situated adjacent said base portion of said first frustum-shaped portion and adjacent said base portion of said second frustum-shaped portion.

8. The greenhouse condenser system of claim 7, wherein:
said separating sheet redirects a flow of a medium in said foldable plastic film tube.

9. The greenhouse condenser system of claim 7, wherein:
said separating sheet comprises a plurality of openings.

10. The greenhouse condenser system of claim 7, wherein:
each of said first frustum-shaped portion and said second frustum-shaped portion comprises a plastic film, and
said separating sheet comprises a material stiffer than said plastic film.

11. The greenhouse condenser system of claim 7, wherein:
said condenser tube has a generally bellows-like shape.

* * * * *